(No Model.)
O. B. SHALLENBERGER.
VOLT AMMETER.
No. 380,943. Patented Apr. 10, 1888.
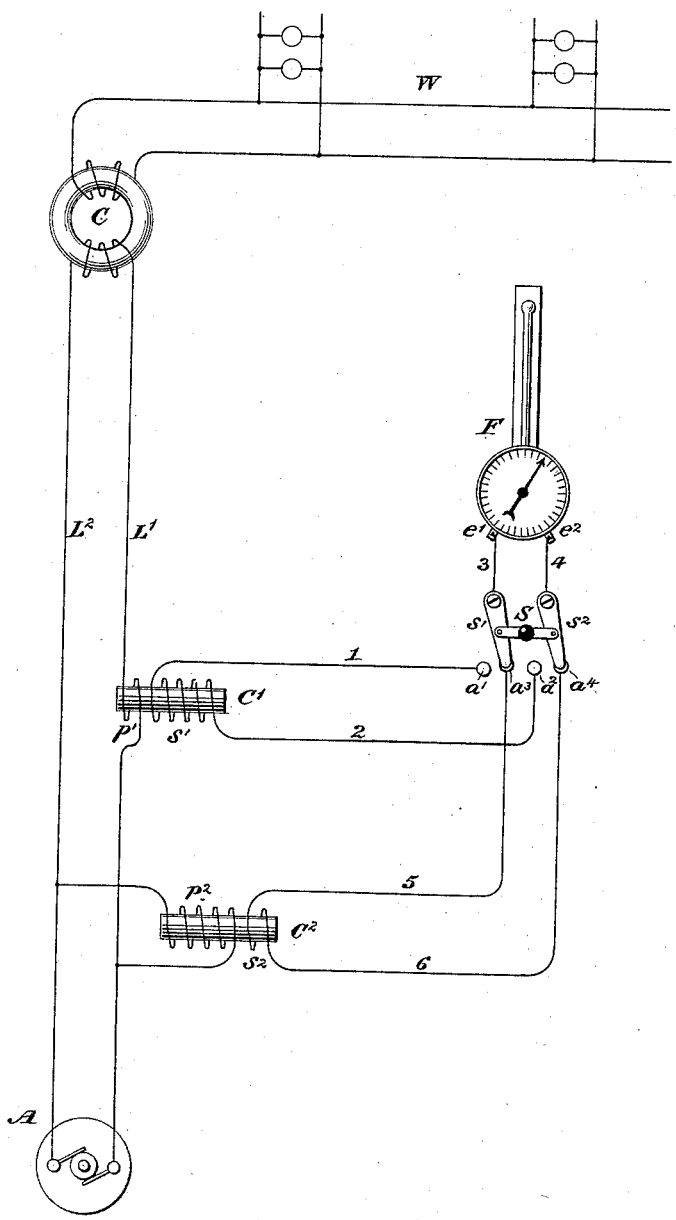
Witnesses
Geo. W. Breck.
Eugene J. Reilly.
Inventor.
O. B. Shallenberger.
By his Attorneys.
Pope Edgecomb & Terry.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

VOLT-AMMETER.

SPECIFICATION forming part of Letters Patent No. 380,943, dated April 10, 1888.

Application filed September 1, 1887. Serial No. 248,467. (No model.)

*To all whom it may concern:*

Be it known that I, OLIVER B. SHALLENBERGER, a citizen of the United States, residing at Rochester, in the county of Beaver and State of Pennsylvania, have invented certain new and useful Improvements in Volt-Ammeters, of which the following is a specification.

The invention relates to the class of devices employed for indicating the current upon any given circuit; and the object is to provide convenient means for measuring the current or the difference of potential at will upon a voltmeter of some well-known construction.

The invention will be described in connection with the accompanying drawing, which illustrates an organization of apparatus adapted to carry out the invention.

Referring to the figure, A represents a generator or other suitable source of alternating, pulsatory, or intermittent currents; and $L'$ $L^2$, conductors leading from the respective poles thereof to a work-circuit, W, which may be connected therewith either directly or through the coils of a converter, C, in a manner well understood. The current which traverses the conductor $L'$, for instance, is of necessity in such a system of considerable amount, and to measure this current conveniently it is proposed by this invention to employ a converter, C', having its primary coil $p'$ included in the direct circuit of the conductor $L'$. The secondary coil $s'$ has its respective terminals connected by the conductors 1 and 2 with contact-points $a'$ $a^2$. A switch, S, is applied to these contact-points, the two arms $s'$ and $s^2$ of which are respectively connected by the conductors 3 and 4 with the binding-posts $e'$ $e^2$ of a suitable voltmeter—as, for instance, a Cardew voltmeter, F, of well-known construction. By placing the switch S in contact with the points $a'$ $a^2$ the terminals of the coil $s'$ will be connected through the voltmeter, and thus the difference of potential will be measured.

The coil $p'$ is of few convolutions relative to the convolutions of the coil $s'$, the proportions being determined by the maximum current in $L'$ $L^2$ and the range of the instrument used for indicating the electro-motive force. The difference of potential at the ends of the coil $s'$ is dependent on and nearly proportional to the current passing through $p'$ if the coils are properly proportioned with respect to each other and the iron core.

It will be understood that the indicator F need not be, properly speaking, a voltmeter, but may be any alternate-current indicator suitable for measuring small currents—as, for example, a Siemens electro-dynamometer. The coil $s'$ must be wound to confine the indications within the limits of the instrument employed.

In some instances it may be desirable to employ the same instrument for measuring the difference of potential between the conductors $L'$ and $L^2$, and for this purpose a second converter, $C^2$, has its primary coil $p^2$ connected with the respective conductors $L'$ and $L^2$, and its secondary coil $s^2$, which is of few convolutions relative to the coil $p^2$, connected by conductors 5 and 6 with two contact-points, $a^3$ and $a^4$, respectively. The switch S may be moved so that its arms $s'$ and $s^2$ will rest upon the points $a^3$ and $a^4$, as shown in the drawing, under which circumstances the difference of potential between the terminals of the coil $s^2$ will be measured by the voltmeter F, and this will be directly proportional to the difference of potential between the conductors $L'$ and $L^2$. The converter $C^2$ is employed for the purpose of reducing the difference of potential to a degree convenient for measurement by the voltmeter F.

I claim as my invention—

1. An ammeter for alternating or pulsatory currents, consisting of the combination, with a voltmeter, of an electric converter having its primary coil connected in series with the work-circuit and its secondary coil connected through said voltmeter, substantially as described.

2. The combination, with a source of alternating or pulsatory electric currents and a work-circuit therefor, of an electric converter having its primary coil connected in series with the work-circuit, a Cardew voltmeter, and means for placing the same in the circuit of the secondary coil of said converter.

3. The combination, with a source of alternating or pulsatory current and its circuit, of an electric converter having its primary coil connected in series with the work-circuit of the source, a second converter having its primary coil connected in multiple arc with said work-circuit, a voltmeter, and means for placing said voltmeter in circuit with the secondary coil of either of said converters.

In testimony whereof I have hereunto subscribed my name this 1st day of July, A. D. 1887.

OLIVER B. SHALLENBERGER.

Witnesses:
W. D. UPTEGRAFF,
CHARLES A. TERRY.